United States Patent [19]
Perkins

[11] Patent Number: 5,412,654
[45] Date of Patent: May 2, 1995

[54] HIGHLY DYNAMIC DESTINATION-SEQUENCED DESTINATION VECTOR ROUTING FOR MOBILE COMPUTERS

[75] Inventor: Charles E. Perkins, Ossining, N.Y.

[73] Assignee: International Business Machines Corporation, Armonk, N.Y.

[21] Appl. No.: 179,397

[22] Filed: Jan. 10, 1994

[51] Int. Cl.$^6$ .................. H04Q 7/22; H04L 12/56
[52] U.S. Cl. .................. 370/94.1; 455/11.1
[58] Field of Search .................. 370/94.1, 60, 60.1, 370/61, 92; 455/33.1, 56.1, 54.1, 11.1, 13.1, 13.2, 7

[56] References Cited

U.S. PATENT DOCUMENTS

| | | | |
|---|---|---|---|
| 4,947,452 | 8/1990 | Hattori et al. | 455/33.1 |
| 4,987,536 | 1/1991 | Humblet | 370/60 |
| 5,088,032 | 2/1992 | Bosack | 370/94.1 |
| 5,159,592 | 10/1992 | Perkins | 370/85.7 |
| 5,175,867 | 12/1992 | Wejke et al. | 455/33.1 |

*Primary Examiner*—Douglas W. Olms
*Assistant Examiner*—Huy D. Vu
*Attorney, Agent, or Firm*—Whitham, Curtis, Whitham & McGinn; Douglas Cameron

[57] ABSTRACT

Packets are transmitted between stations of an ad-hoc network of mobile stations by using routing tables which are stored at each station of the network. Routing information is broadcast or multicast according to three schedules; upon demand to show new routes, periodically to show recently changed routes, and less often to provide a complete dump of all known routes. A new route will trigger immediate re-broadcast so that this information is quickly disseminated. A new route is defined to be one with a better metric or a metric of infinity. A metric of infinity indicates a broken link; i.e., a particular destination is no longer reachable and thus all other destinations depending upon the newly unreachable destination are themselves unreachable. Periodically, routes are advertised. This advertisement serves primarily in most cases to notify all neighbors that everything they have stored is still correct regarding the broadcasting Mobile Host. On rarer occasions when the routing topology changes, the demand nature of the incremental update displaces the periodic transmission until an update interval transpires. In order to damp out oscillations, data is kept about how often the routes change. Based on this data, a decision may be made to delay advertising routes which are about to change soon, thus damping oscillations of the route tables.

10 Claims, 9 Drawing Sheets

HIGHLY DYNAMIC DESTINATION-SEQUENCED DESTINATION VECTOR ROUTING FOR MOBILE COMPUTERS

BACKGROUND OF THE INVENTION

1. Field of the Invention

The present invention generally relates to wireless data communications systems and, more particularly, to link-layer routing for mobile computers.

2. Description of the Prior Art

Many different networking protocols have been defined. For example, the International Business Machines (IBM) Corp. established the System Network Architecture (SNA) which defines a particular protocol permitting communication for IBM and compatible computers. The International Standards Organization (ISO) is an international body that has published standards for Open Systems Interconnection (OSI) architecture. The Defense Data Network (DDN) standard establishes criteria for the Internet Protocol (IP) which supports the interconnection of Local Area Networks (LANs). The IP defines the services provided to users, and specifies the mechanisms needed to support those services. The standard also defines the services required for the lower protocol layer, describes the upper and lower interfaces, and outlines the execution environment services needed for implementation.

The Transmission Control Protocol (TCP) is a transport protocol providing connection oriented, end-to-end reliable data transmission in packet-switched computer LANs and internetworks. The IP and TCP are mandatory for use in all Department of Defence (DoD) packet switching networks which connect or have the potential for utilizing connectivity across network or subnetwork boundaries. Network elements, such as hosts, front-ends, gateways, and the like, within such networks which are to be used for internetworking must implement TCP/IP.

IP is designed to interconnect packet-switched communication LANs to form an internetwork. IP transmits blocks of data, called internet datagrams, from sources to destinations through the internet. Sources and destinations are hosts located on either the same subnetwork or on connected LANs. The DDN standard specifies a host IP. As defined in the DoD architectural model, the IP resides in the internetwork layer. Thus, the IP provides services to transport layer protocols and relies on the services of the lower network protocol. Various network access protocols reside below the IP and may include, for example, an Ethernet protocol, an X.25 protocol, and, of particular interest herein, a wireless medium access protocol.

The Internet protocols were originally developed with an assumption that users, each of which is assigned a unique Internet address, would be connected to the network at fixed locations. However, for portable and handheld computers employing a wireless protocol, the movement or migration or users about the network is typically the rule rather than the exception. As a result, a problem is created in that the implicit design assumptions of the Internet protocol are violated by this type of usage.

Currently, there is no method available which enables mobile computers with wireless data communications equipment to freely roam about while still maintaining connections with each other, unless special assumptions are made about the way the computers are situated with respect to each other. One mobile computer may often be able to exchange data with two other mobile computers which cannot themselves directly exchange data. As a result, computer users in a conference room may be unable to predict which of their associates' computers could be relied upon to maintain network connection, especially as the users moved from place to place within the room.

The problem that arises relates to providing optimal network layer routing with a mobile host when network layer address(es) assigned to that host may not bear any network topological significance. The problem arises because of a requirement for a host to have an identifier that remains fixed, even as the host moves, while at the same time providing sufficient information in the network layer to make network layer routing feasible.

SUMMARY OF THE INVENTION

It is therefore an object of the present invention to provide a data communication system that allows a collection of mobile computers, which can at any point in time exchange data along changing and arbitrary paths of interconnection, to afford all computers among their number a (possibly multi-hop) path along which data can be exchanged.

It is another, more specific object of the invention to provide a technique that allows data to be exchanged between a plurality of mobile computers along constantly changing paths using link-layer routing without the aid of a fixed base station.

According to the invention, there is provided a method and apparatus for routing packets between stations of a wireless data communications network. Packets are transmitted between the stations of the network by using routing tables which are stored at each station of the network. Each routing table that is stored in each of the stations provides a list of each station that is accessible from itself and the number of hops necessary to reach each accessible station. To maintain these tables in a dynamically varying topology, link-layer packets are transmitted from each of the stations to update the tables. These link-layer packets indicate stations that are accessible from each station and the number of hops necessary to reach these accessible stations.

Routing information is advertised by broadcasting or multicasting the link-layer packets which are transmitted periodically and incrementally as topological changes are detected as a result of stations moving within the network. Also, in order to damp out oscillations, data is kept about how often the routes change. Based on this data, a decision may be made to delay advertising routes which are about to change soon, thus damping oscillations of the route tables. Advertisement of certain routes is delayed so as to prevent oscillation between two interfering link-layer packets.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
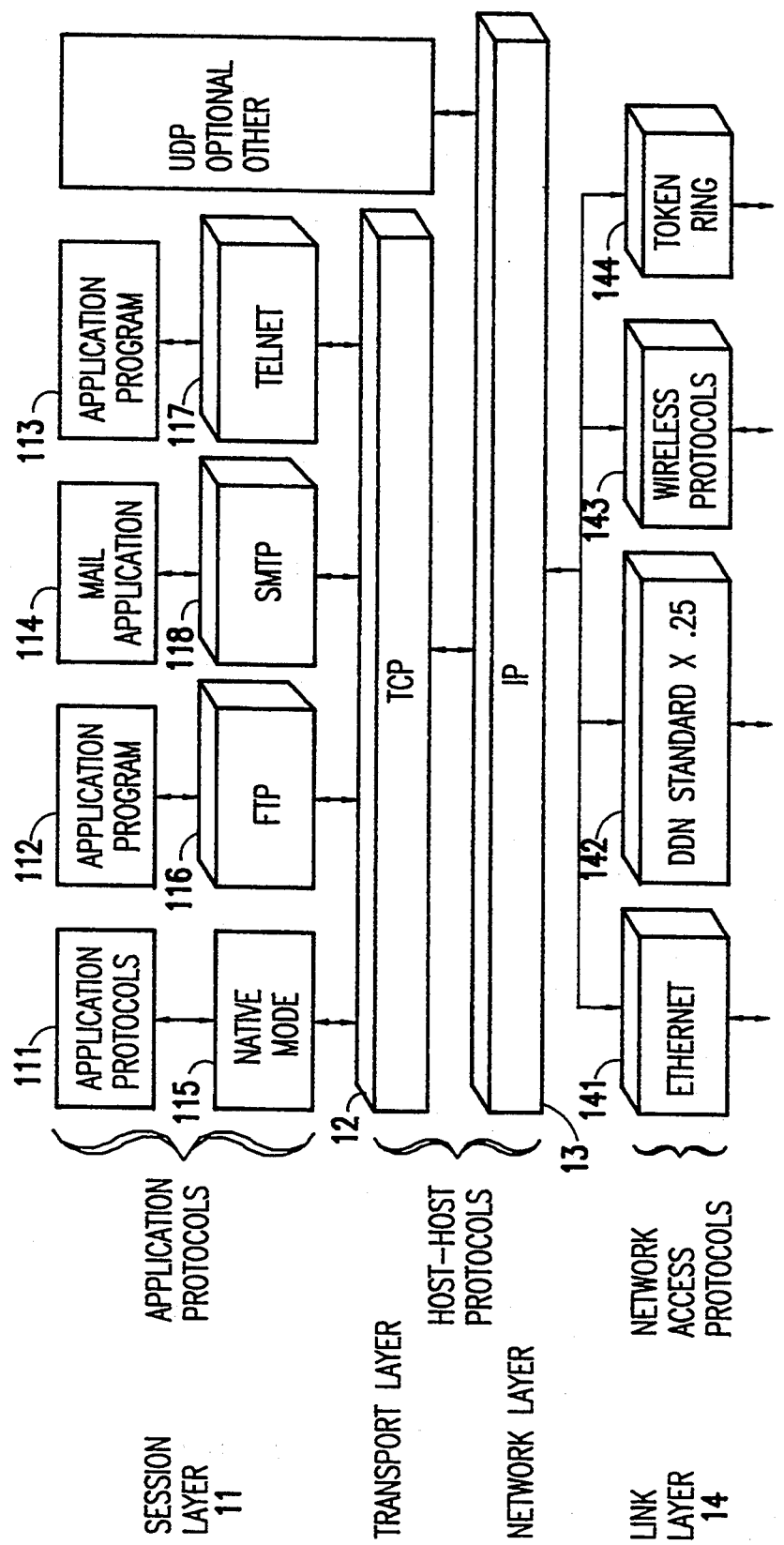
FIG. 1 is an architectural diagram of the Defense Data Network.

Referring now to the drawings, and more particularly to FIG. 1, there is shown an architectural diagram of the Defense Data Network (DDN) to illustrate the protocol layers of a network. The top layer 11 is the Session layer comprising various application protocols 111 and application programs 112 and 113. In addition, there is typically an electronic mail (e-mail) application program 114. These communicate with the Transport layer, or Layer 4, via protocols appropriate to the application. For example, the application protocols 111 communicate with Layer 4 via their native mode 115, application protocol 112 communicates via file transfer protocol (FTP) 116, while application program communicates via the Telnet protocol 117, and mail application 114 communicates via simple mail transfer protocol (SMTP) 118.

Layer 4, or the Transport layer, may be composed of the Transmission Control Protocol (TCP) transport layer 12, and Layer 3, or the Network layer, is composed of the Internet Protocol (IP) layer 13. The two layers 12 and 13 comprise a TCP/IP protocol suite which share a common name and address space.

Link layer 14, or Layer 2, is composed of the Link layer and the Media Access Control (MAC). In the Link layer 14 are the various Network Access Protocols, including Ethernet 141, the DDN standard X.25 142, wireless protocols 143, and token ring 144. These are typically defined by a standard promulgated by a standards institution. For example. Ethernet is defined by IEEE (Institute of Electrical and Electronic Engineers) Standard 802.3. and token ring is defined by IEEE Standard 802.5.

Finally, Layer 1 (not shown) is the Physical layer. This layer relates to cabling and connections and transmission parameters, including data encoding. For additional information on the layers and protocols of internetworking, see Douglas E. Comer, *Internetworking with TCP/IP, Volume I. Principles, Protocols, and Architecture*, Prentice-Hall (1990).

The practice of the preferred embodiment of the present invention is specifically directed to that portion of the architecture shown in FIG. 1 identified as the Link layer, or Layer 2, although similar techniques may be employed at Layer 3, according to more conventional routing technology. According to the invention, each mobile station is required to advertise to each of its current neighbors its own list of its neighbors. The entries in this list will change fairly dynamically over time, so the advertisement must be made often enough to ensure that every mobile computer can usually locate ever), other mobile computer of the collection. In addition, each mobile computer agrees to relay data to another computer upon request. In this way a mobile computer may exchange data with any other mobile computer in the group even if the target of the data is not within range for direct communication. This way of sending data through other computers used as intermediate points is known as routing. Routing has not previously been applied to the problem stated above for mobile computer systems at the Link Layer of a network protocol. The notification of which other mobile computers are accessible from any particular computer in the collection is, according to the invention, to be done at the Link Layer of the protocol, so that the method of the invention will work with whatever higher layer (e.g., Network Layer) protocol might otherwise be in use. The collection of mobile computers in the collection effectively form a new "network", and they do so with no administration. This style of communication has been called "ad-hoc" networking.

Mobile computers will frequently be used in conjunction with "base stations", which allow them to exchange data with other computers maintaining network connections along a wired backbone within a building. In this case, the routing function is largely assumed by the base station, because the base station is assumed to always have plenty of electrical power, whereas the mobile computers may be on a strictly limited power budget. The base stations will participate in the link-layer routing in such a way that mobile computers will trust each base station to have access to every mobile computer within range of the base station. If a mobile computer is within range of a base station, it will advertise direct connectivity to the base station by each of its periodic broadcasts of its list of neighbors. The base station may or may not broadcast the list of which mobile stations may collaborate to create paths for data exchange among mobile computers within different cells.

Since all the routing functions described use link-layer addressing techniques (so-called "hardware addresses"), the method described is most applicable to an installation using a single physical medium. Computers located on different networks use network-layer techniques to establish and maintain paths for data exchange. The method described here for link-layer routing can be used in conjunction with such other techniques or adapted purely for use at Layer 3 by considering Layer 3 addresses instead of Layer 2 (i.e.. "hardware") addresses and ignoring the transmission of Layer 3 protocol lists. Single network data paths can be presented at the link layer, and multiple network data paths can be handled at the network layer. Base stations in a multiple network installation are responsible for determining whether a required data path should be established at the link layer or at the network layer. When no base stations are involved, the mobile computers use the link layer routing described here exclusively.

All the computers interoperating to create data paths between themselves will broadcast the necessary data periodically, say once every second or once every few seconds (or, eventually, only as needed, when a way is designed to reliably determine that a new broadcast is needed). The data broadcast by each mobile computer will contain its routing tables, including for each destination at least the following information:

The destination's link-layer address;
The number of hops required to reach the destination;
The timestamp of the information received regarding that destination, as originally stamped by the destination; and
Whether the destination is willing to serve as a default router (e.g., the destination is a base station).

The transmitted routing tables will also contain the hardware address of the mobile computer transmitting them, by the natural action of the link-layer software. The routing table will also include a timestamp created by the transmitter. There may also be an indication of which base station is serving each mobile computer, for routing algorithms which try to determine whether or not a particular mobile computer is accessible in the same cell or not.

When such a routing table is received by a mobile computer, that computer will then begin to update its own locally stored routing tables. Each received route will update any existing route which shows the same destination and next hop. The timestamp will be replaced with the new timestamp, and the number of hops shown in the received route will be incremented and stored. The number of hops along the path to any computer will be referred to as the "metric" for that path. The address of the transmitter of the routing tables will be stored as the address of the next hop along the way to the destination. No other addresses further along the path to the (eventual) destination need to be stored. When a route entry is received that does not correspond to any existing pair of (destination, next-hop) addresses, a new entry will be allocated for that destination. A local routing table entry will be created or updated for the computer originating the transmitted routing tables, and the metric for that entry will be one-indicating that only a single hop is needed to reach the computer. In other words, the two computers (transmitter and receiver of the routing tables) are "neighbors".

Each destination will have a limited (small) number of possible alternative routes, each designated by a different link-layer address for the next hop along that alternative routing path. Routes with more recent timestamps are always preferred as the basis for making forwarding decisions, but not necessarily advertised. When more alternatives seem possible, those paths with the least metrics will be stored and the other forgotten. If a selection must be made between alternative paths with identical metrics, the paths with the most recent timestamps will be selected. Almost all timestamps are originated by the eventual destination, because each mobile computer that is transmitting its local routing tables stamps each transmission with its local value of the time. By the natural way in which the routing tables are to be propagated, the timestamp is carried along to each other mobile computer which may decide to maintain a routing entry for that originating mobile computer. If the mobile computers are synchronized, only a single timestamp is needed for the whole ad-hoc community of mobile computers.

So far, what has been described is really only the way that the necessary routing data is propagated and stored. More details about the actual way routing tables are locally manipulated and updated will be given later. The data will be used in two ways; one for incoming packets and one for outgoing packets. The operation of link-layer routing may be best understood as occurring in a thin protocol layer inserted between the link layer and, if present, a network-layer protocol ("Layer 3" in the International Standards Organization (ISO) layered-network terminology). In other words, the link layer routing will occur before other link-layer operations and after any higher-level protocol operations for outgoing packets. Conversely, for incoming packets the link layer routing operations here will be performed after other link-layer operations (e.g., framing, checking data integrity) and before other high-level protocol operations.

For outgoing packets, the link-layer routing operation will determine whether or not the actual destination is a neighboring computer; if not, then the data received by the link layer will be encapsulated and a new link-layer header constructed, containing a new destination address and a new Layer-2 (link-layer) packet type. The new destination will be that of the next hop along the way to the actual destination. The packet type will be a number commonly agreed upon to trigger the link-layer routing procedure being described, in other words, the different handling of the new routing requests will be triggered in the same way that Address Resolution Protocol (ARP) requests or higher-level protocol handing is triggered now. Whether or not a new packet type and destination are to be wrapped around the data received by the link-layer routing module, the packet is then transmitted via the normal operation of the link layer.

Whenever a packet comes in that needs to be routed by such link-layer operations to another destination, that packet will be re-addressed and sent along to the next hop. If the next hop is the actual destination, the actual destination and the actual desired packet type will be exposed by decapsulating the original data and discarding the encapsulation that was needed for purposes of routing. If the next hop is not the actual destination, then the packet type and link-layer header will remain as is, except that the apparent destination will be changed into the address of the next hop along the way, and any checksums or data integrity indicators will be updated as needed. In either case, protocols above the link layer are not activated in the computer performing link-layer routing.

Figure 2:
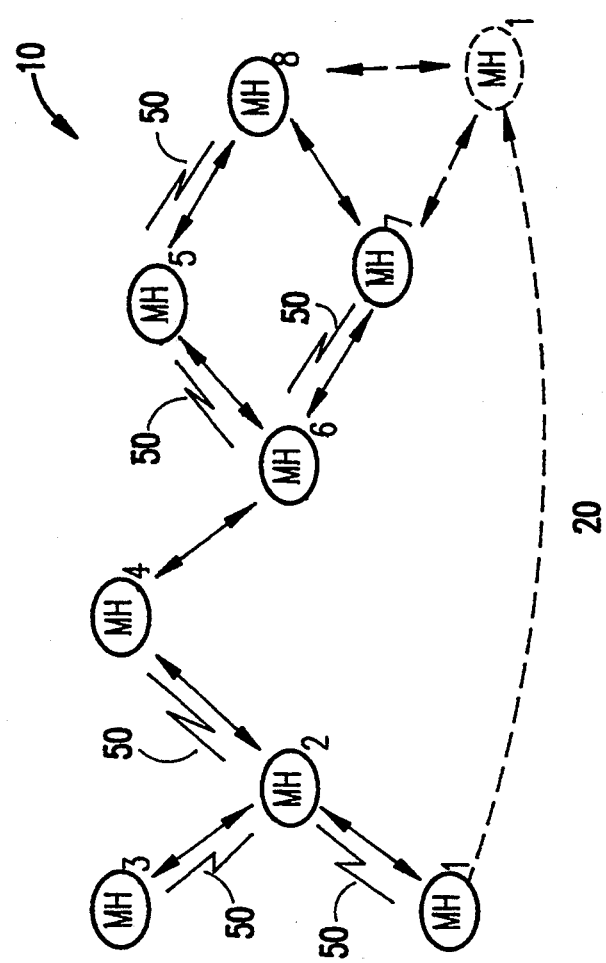
FIG. 2 is a functional block diagram of an "ad-hoc" network of a plurality of wireless mobile hosts.

FIG. 2 shows an ad-hoc network 10 with mobile hosts MH1 through MH8 with bi-directional wireless links 50. Also shown is MH1 moving from a location in the neighborhood of MH2 to a location in the neighborhoods of MH7 and MH8 as shown by the dotted lines. With this invention, packets can be routed between mobile hosts of network 10 without communication with a base station of a fixed, wired network, the information necessary to route packets through network 10 is contained in tables (shown below) maintained in each of the mobile hosts. These tables are updated so as to account for the constantly changing topology of network 10 caused by movement of the mobile host.

The overall idea is to cause each Mobile Host to broadcast its routing tables periodically, and correspondingly to update its routing tables when such broadcasts from its neighbors are received. In this way, as each broadcast is processed, every Mobile Host will build up a complete description of the current topology of interconnections between all the cooperating Mobile Hosts desiring to build up the ad-hoc network. Each route table entry is tagged with a timestamp, and the timestamp is used to resolve several issues associated with destination-vector algorithms such as Bellman- Ford routing. Such algorithms are computationally efficient. Routes are chosen when they have the "best" metric for the desired destination. The usual "metric" is the number of "hops" that a packet must jump before reaching its destination.

Routes received in broadcasts are also advertised by the receiver when it subsequently broadcasts its routing information; the receiver adds an increment to the metric before advertising the route, since incoming packets will require one more hop to reach the destination (namely, the hop from the transmitter to the receiver).

One of the most important parameters to be chosen is the time between broadcasting the routing information packets. However, when any new or substantially modified route information is received by a Mobile Host, the new information will be retransmitted immediately, effecting the most rapid possible dissemination of routing information among all the cooperating Mobile Hosts. This immediate re-broadcast introduces a new requirement for our protocols to converge as soon as possible. It would be calamitous if the movement of a Mobile Host caused a storm of broadcasts, degrading the availability of the wireless medium.

Mobile Hosts cause broken links as they move from place to place. A broken link is described by a metric of "infinity" (i.e., any value greater than the maximum allowed metric). When a link to a next hop has broken, any route through that next hop is immediately assigned an infinite metric and assigned an updated timestamp. Since this qualifies as a substantial route change, such modified routes are immediately disclosed in a broadcast routing information packet. Building information to describe broken links is the only situation when the timestamp is generated by any Mobile Host other than the destination Mobile Host. Again, if the mobile computers are synchronized, only a single timestamp is needed. Timestamps defined by the originating Mobile Hosts are defined to be even numbers, and timestamps generated to indicate $\infty$ metrics are odd numbers. In this way any "real" timestamp will supersede an $\infty$ metric.

In a very large population of Mobile Hosts, adjustments will likely be made in the time between broadcasts of the routing information packets. In order to reduce the amount of information carried in these packets, two types will be defined. One will carry all the available routing information, called a "full dump". The other type will carry only information changed since the last full dump, called an "incremental". By design, an incremental routing update should fit in one network protocol data unit (NPDU). The full dump will most likely require multiple NPDUs, even for relatively small populations of Mobile Hosts. Full dumps can be transmitted relatively infrequently when no movement of Mobile Hosts is occurring. When movement becomes frequent, and the size of an incremental approaches the size of a NPDU, then a full dump can be scheduled (so that the next incremental will be smaller).

When a Mobile Host receives new routing information (usually in an incremental packet as just described), that information is compared to the information already available from previous routing information packets. Any route with a more recent timestamp is used. Routes with older timestamps are discarded. A route with a timestamp equal to an existing route is chosen if it has a "better" metric, and the existing route discarded, or stored as less preferable. The metrics for routes chosen from the newly received broadcast information are each incremented by one hop. Newly recorded routes, or routes which show an improved metric, are scheduled for immediate advertisement to the current Mobile Host's neighbors.

Timing skews between the various Mobile Hosts are expected. The periods between broadcasts of routing information by the Mobile Hosts are to be regarded as somewhat asynchronous events, even though some regularity is expected. In such a population of independently transmitting agents, some oscillation could develop using the above procedures for updating routes. The problem could develop that a particular Mobile Host would receive new routing information in a pattern which causes it to consistently change routes from one next hop to another, even when the destination Mobile Host has not moved. This happens because there are two ways for new routes to be chosen; they might have a later timestamp, or they might have a better metric. A Mobile Host could conceivably always receive two routes to the same destination, with a newer timestamp, one after another (via different neighbors), but always get the route with the worse metric first. Unless care is taken, this will lead to a continuing burst of new route transmittals upon every new timestamp from that destination. Each new metric is propagated to every Mobile Host in the neighborhood, which propagates to their neighbors and so on.

The solution according to a preferred embodiment of the invention is to delay the advertisement of such routes when a Mobile Host can determine that a route with a better metric is likely to show up soon. The route with the later timestamp must be available for use, but it does not have to be advertised immediately unless it is a route to a destination which was previously unreachable. Thus, there will be two routing tables kept at each Mobile Host; one for use with forwarding packets, and another to be advertised via incremental (and full) routing information packets. To determine the probability of imminent arrival of routing information showing a better metric, the Mobile Host has to keep a history of how long a particular route usually lasts before it is updated with a better metric.

All of the above procedures are valid whether carried out at the network layer (Layer 3) or the link layer (Layer 2) of the protocol stack. Thus, if it is desired to have an ad-hoc network of Mobile Hosts which can communicate using several possible Layer 3 protocols, one can operate the packet broadcasts and forwarding at Layer 2. This would allow, for instance, intermediate Mobile Hosts to forward packets in service of two endpoints which did not operate the same Layer 3 protocols as did the intermediate Mobile Hosts.

The addresses stored in the routing tables will correspond to the Layer at which this ad-hoc networking protocol is operated. That is, operation at Layer 3 will use network layer addresses for the next hop and destination addresses, and operation at Layer 2 will use Layer 2 Media Access Control (MAC) addresses.

Using MAC addresses for the forwarding table does introduce a new requirement, however. The difficulty is that Layer 3 network protocols provide communication based on network three addresses, and a way must be provided to resolve these Layer 3 addresses into MAC addresses. Otherwise, a multiplicity of different address resolution mechanisms would be put into place, and a corresponding loss of bandwidth in the wireless medium would be observed whenever the resolution mechanisms were utilized. This could be substantial since such mechanisms would require broadcasts and retransmitted broadcasts by every Mobile Host in the ad-hoc network. Thus, unless special care is taken, every address resolution might look like a glitch in the normal operation of the network, which may well be noticeable to any active users.

The solution according to the invention, for operation at Layer 2, is to include Layer 3 protocol information along with the Layer 2 routing information. Each destination host would advertise which Layer 3 protocols it supports, and each Mobile Host advertising reachability to that destination would include along, with the advertisement, the information about the Layer 3 protocols supported at that destination. This information would only have to be transmitted when it changes, which occurs rarely. It would be transmitted as part of each "full dump". Since each Mobile Host could support several Layer 3 protocols (and many do), this list would have to be variable in length.

Table 1 shows the structure of a route entry in an internal forwarding table which is maintained at each of the mobile hosts in network 10 shown in FIG. 2.

TABLE 1

| destination address | protocol dependent size |
|---|---|
| next hop address | protocol dependent size |
| metric | unsigned integer |
| timestamp | from destination; unsigned integer |
| install_time | machine dependent, (e.g., 32 bits) |
| pointer to stability data | machine dependent |
| pointer to protocol data | machine dependent, Layer 2 only |

For instance, consider Mobile Host 4 in FIG. 1. Suppose the address of each Mobile Host is represented as MHX and that all Mobile Hosts are support Internet Protocol (IP) only. Suppose further that all timestamps are denoted TNNN_MHX, where MHX specifies the computer that created the timestamp and TNNN is a time value, also suppose that there are entries for all other Mobile Hosts, with timestamps TNNN_MHX, before Mobile Host 1 moves away from Mobile Host 2.

From this, one could surmise, for instance, that all the computers became available to MH4 at about the same time, since its install_time for most of them is about the same. One could also surmise that none of the links between the computers were broken, because all of the timestamp fields have times with even digits in the units place. PTR1_MHX would all be pointers to null structures, because there are not any routes in FIG. 1 which are likely to be superseded or compete with other possible routes to any particular destination. The Proto_data pointers would all point to a structure with the following format:

Proto_ID=IP, Proto_address_length=4 bytes,
Proto_address=[MHX.Net.addr.ess], where MH1.Net.addr.ess would be the four bytes of the IP address for MH1, displayed in standard Internet 4-octet from.

Table 2 shows the structure of the route entry in the advertised route table.

TABLE 2

| destination address | protocol dependent size |
|---|---|
| metric | unsigned integer |
| timestamp | from destination; unsigned integer |
| size of next Layer-3 address | 0 = = > no more, 8 bits |
| next address's protocol ID | 8 bits |
| Next Layer-3 protocol address | |

The last items are only present when the ad-hoc algorithms are operated at Layer-2. The next hop is implicit in all advertisements, so it need not be listed. Suppose that the operation is at Layer-2, and that the Mobile Hosts have addresses X:X:X:X:X:X, so that Mobile Host has MAC address 1:1:1:1:1:1 (shown in standard format). Suppose further that IP is denoted as having Layer-3 protocol ID 7. Also suppose correspondingly that the Internet Address for Mobile Host MHX is shown as X.X.X.X. Then, in the situation shown above, the advertised routes might appear as follows:

| Destination | Metric | Timestamp | Length | ID | Layer_3_Address | Length |
|---|---|---|---|---|---|---|
| 1:1:1:1:1 | 2 | T406_MH1 | 4 | 7 | 1.1.1.1 | 0 |
| 2:2:2:2:2 | 1 | T128_MH2 | 4 | 7 | 2.2.2.2 | 0 |
| 3:3:3:3:3 | 2 | T564_MH3 | 4 | 7 | 3.3.3.3 | 0 |
| 4:4:4:4:4 | 0 | T710_MH4 | 4 | 7 | 4.4.4.4 | 0 |
| 5:5:5:5:5 | 2 | T392_MH5 | 4 | 7 | 5.5.5.5 | 0 |
| 6:6:6:6:6 | 1 | T076_MH6 | 4 | 7 | 6.6.6.6 | 0 |
| 7:7:7:7:7 | 2 | T128_MH7 | 4 | 7 | 7.7.7.7 | 0 |
| 8:8:8:8:8 | 3 | T050_MH8 | 4 | 7 | 8.8.8.8 | 0 |

Then the internal forwarding table at MH4 might appear as follows (note that the rows correspond to different Mobile Hosts, and the columns correspond to the data just described in the above structure):

Now suppose that Mobile Host 1 moves into the general vicinity of Mobile Hosts 5 and 7, and away from the others (especially Mobile Host 2). The new internal forwarding tables at Mobile Host 4 might then be:

| Destination | NextHop | Metric | Timestamp | Install | Flags | Stable_data | Proto_data |
|---|---|---|---|---|---|---|---|
| MH1 | MH2 | 2 | T406_MH1 | T001_MH4 | | PTR1_MH1 | PTR2_MH1 |
| MH2 | MH2 | 1 | T128_MH2 | T001_NM4 | | PTR1_MH2 | PTR2_MH2 |
| NM3 | MH2 | 2 | T564_MH3 | T001_MH4 | | PTR1_MH3 | PTR2_MH3 |
| NM4 | MH4 | 0 | T710_MH4 | T001_MH4 | | PTR1_MH4 | PTR2_MH4 |
| MH5 | MH6 | 2 | T392_MH5 | T002_MH4 | | PTR1_MH5 | PTR2_MH5 |
| MH6 | MH6 | 1 | T076_MH6 | T001_MH4 | | PTR1_MH6 | PTR2_MH6 |
| MH7 | MH6 | 2 | T128_MH7 | T002_MH4 | | PTR1_MH7 | PTR2_MH7 |
| MH8 | NM6 | 3 | T050_MH8 | T002_MH4 | | PTR1_MH8 | PTR2_MH8 |

| Destination | NextHop | Metric | Timestamp | Install | Flags | Stable_data | Proto_data |
|---|---|---|---|---|---|---|---|
| MH1 | MH6 | 3 | T516_MH1 | T810_MH4 | M | PTR1_MH1 | PTR2_MH1 |
| MH2 | MH2 | 1 | T238_MH2 | T001_MH4 | | PTR1_MH2 | PTR2_MH2 |
| MH3 | MH2 | 2 | T674_MH3 | T001_MH4 | | PTR1_MH3 | PTR2_MH3 |
| MH4 | MH4 | 0 | T820_MH4 | T001_MH4 | | PTR1_MH4 | PTR2_MH4 |
| MH5 | MH6 | 2 | T502_MH5 | T002_MH4 | | PTR1_MH5 | PTR2_MH5 |
| MH6 | MH6 | 1 | T186_MH6 | T001_MH4 | | PTR1_MH6 | PTR2_MH6 |
| MH7 | MH6 | 2 | T238_MH7 | T002_MH4 | | PTR1_MH7 | PTR2_MH7 |
| MH8 | MH6 | 3 | T160_MH8 | T002_MH4 | | PTR1_MH8 | PTR2_MH8 |

Only the entry for MH1 shows a new metric, but in the intervening time, many new timestamp entries have been received. The first entry thus has a flag M (for Metric), and must be advertised in subsequent incremental routing information updates until the next full dump occurs. When Mobile Host 1 moved into the vicinity of Mobile Hosts 5 and 7, it triggered an immediate Incremental routing information update which was then broadcast to Mobile Host 6. Mobile Host 6, determining that significant new routing information had been received, also triggered an immediate update which carried along the new routing information for Mobile Host 1 to Mobile Host 4. Mobile Host 4, upon receiving this information, would then broadcast it at every interval until the next full routing information dump. At Mobile Host 4, the incremental advertised routing update would have the following form:

| Destination | Metric | Timestamp |
|---|---|---|
| 4 4 4 4 4 4 | 0 | T820_MH4 |
| 1 1 1 1 1 1 | 3 | T516_MH1 |
| 2 2 2 2 2 2 | 1 | T238_MH2 |
| 3 3 3 3 3 3 | 2 | T674_MH3 |
| 5 5 5 5 5 5 | 2 | T502_MH5 |
| 6 6 6 6 6 6 | 1 | T186_MH6 |
| 7 7 7 7 7 7 | 2 | T738_MH7 |
| 8 8 8 8 8 8 | 3 | T160_MH8 |

In this advertisement, the information for Mobile Host 4 comes first, since it is doing the advertisement. The information for Mobile Host 1 comes next, not because it has a lower address, but because Mobile Host 1 is the only one which has any significant route changes affecting it. The general incremental routing update has the following form:

| | |
|---|---|
| Transmitter information | "my address", metric = 0 |
| Routes with changed Layer-3 routes with changed metrics routes with changed timestamps | protocol availability information |

In this example, no Mobile Hosts have changed their Layer 3 protocol configuration. One computer has changed its routing information, since it is in a new location. All computers have transmitted new timestamps recently. If there were too many updated timestamps to fit in a single packet, only the ones which fit would be transmitted. These would be selected with a view to fairly transmitting them in their turn over several incremental update intervals.

There is no such required format for the transmission of full routing information packets. As many packets are used as are needed, and all available information is transmitted (including the needed Layer 3 address information).

In order to handle the time-dependent nature of several operations within the ad-hoc network protocols, a standard event-list structure must be maintained. A sample node might be as follows:

| |
|---|
| Event Time |
| Event identification |
| Event data (pointer to a route entry) |

When the computer's clock ticks, the even list is checked. If the first node has expired, then the event node is pulled from the list, the identification used to call the correct handling procedure, and the event data passed as an argument to the event handler.

The following description relates to the settling time table and explains its use in preventing oscillations of routing table entries. The general problem arises because route updates are selected according to the following criteria:

Routes are always preferred if the timestamps are newer; and

Otherwise, routes are preferred if the timestamps are the same and yet the metric is better (lower).

Figure 3:
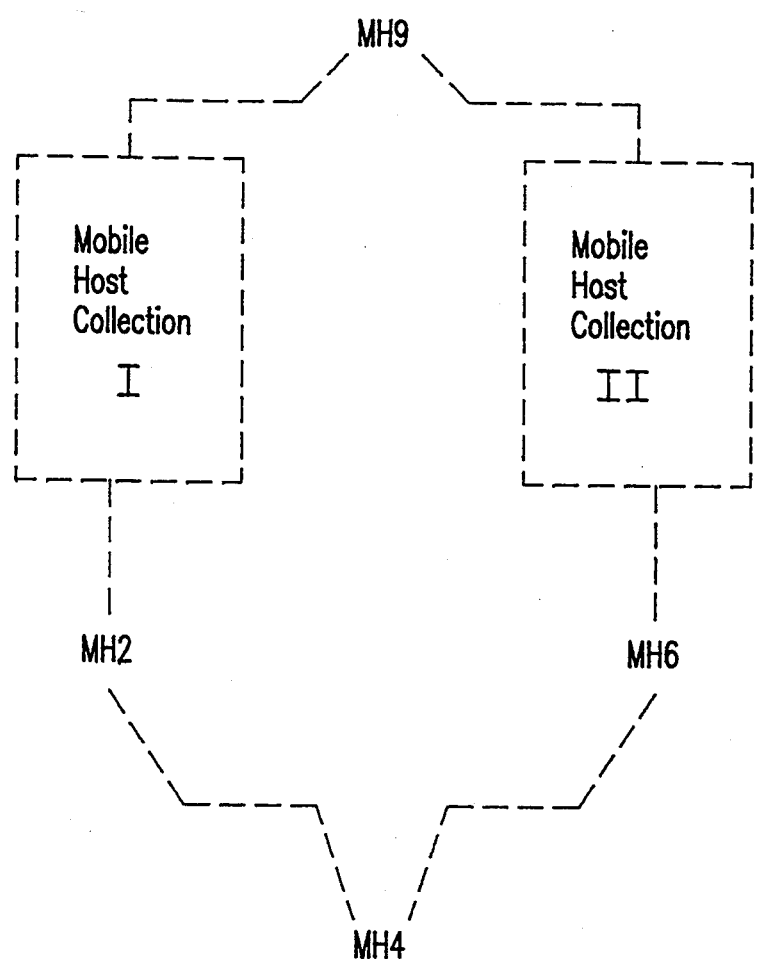
FIG. 3 is a functional block diagram of showing two separate collections of Mobile Hosts connected to a common destination.

To see the problem, suppose that two routes with identical timestamps are received by a Mobile Host, but in the wrong order. In other words, suppose that Mobile Host 4 receives the higher metric next hop first, and soon after gets another next hop with a lower metric by the same timestamp. This could happen when there are a lot of Mobile Hosts, transmitting their updates not quite regularly. Alternatively, if the Mobile Hosts are acting quite independently with markedly different transmission intervals, the situation could occur with correspondingly fewer hosts. Suppose, in any event, in FIG. 3 that there are enough Mobile Hosts to cause the problem, in two separate collections of Mobile Hosts both connected to a common destination MH9, but with no other Mobile Hosts in common. Suppose further that all Mobile Hosts are transmitting updates approximately every 15 seconds, that Mobile Host MH2 has a route to MH9 with 12 hops, and Mobile Host MH6 has a route to MH9 with 11 hops. Moreover, suppose that the routing information update from MH2 arrives at MH4 approximately 10 seconds before the routing information update from MH6. This will occur every time that a new timestamp is issued from Mobile Host MH9. In fact, the time differential can be drastic if any Mobile Host in collection II begins to issue its timestamp updates in multiple incremental update intervals, as would happen, for instance, when there are too many hosts with new timestamp updates for them all to fit within a single incremental packet update. In general, the larger the number of hops, the more drastic differentials between delivery of the updates can be expected in FIG. 3.

The settling time data is stored in a table with the following form, keyed by the first two fields:

| |
|---|
| Destination address |
| Next Hop address |
| Last settling time time |
| Average settling time |

Suppose a new routing information update arrives at Mobile Host 4. The timestamp in the new entry is the same as the timestamp in the currently used entry, and the newer entry has a worse (i.e., higher) metric. Then Mobile Host 4 must use the new entry in making subsequent forwarding decisions. However, Mobile Host 4 does not have to advertise the new route immediately and can consult its route settling time table to decide how long to wait before advertising it. The average settling time is used for this determination. For instance, Mobile Host 4 may decide to delay (average_settling_time * 2) before advertising a route.

This can be quite beneficial, because if the possibly unstable route were advertised immediately, the effects would ripple through the network, and this bad effect would probably be repeated every time Mobile Host MH9's timestamp updates rippled through the ad-hoc network. On the other hand, if a link via Mobile Host MH6 truly does break, the advertisement of a route via MH2 should proceed immediately. To achieve this when there is a history of oscillations at Mobile Host MH4, the link breakage should be detected fast enough so that an intermediate host in Collection II finds out the problem and begins a triggered incremental update showing an infinite metric for the path along the way to Mobile Host MH9. In other words, if a problem shows up which imitates a previously oscillatory routing update, that problem is likely to have other effects which will dominate the route update pattern in plenty of time to swamp out the mechanism for avoiding oscillations. Moreover, routes with $\infty$ metric must, by definition, be advertised immediately.

In order to bias the damping mechanism in favor of recent events, the most recent measurement of the settling time of a particular route must be counted with a higher weighting factor than are less recent measurements. And, importantly, a parameter must be selected which indicates how long a route has to remain stable before it is counted as truly stable. This amounts to specifying a maximum value for the settling time for the address pair (destination, next hop) in the settling time table. Any route more stable than this maximum value will cause a triggered update if it is ever replaced by another route with a different next hop or metric.

The methods by which the link-layer software performs route table management are well known, but for illustrative purposes, some details will be given about a specific implementation. The table itself is a statically allocated array of fixed size entries, as is often appropriate for data stored within operating system data memory. Each entry has an integer field specifying the "next" entry, so that the normal mode of access to the routing table is like that of a linked list, and not by linear search (as is often the case with statically sized arrays). Each destination node can have no more than three alternative routes. These routes are stored as three successive elements of the list, with the best route first. If the indicated best route fails, or its data is judged to be stale, then the next routes will be effectively "promoted".

When a new routing update is received from a "neighbor", during the same time that the updates are applied to the table, processing also occurs to delete stale entries. Stale entries are defined to be those for which no update has been applied within the last few update periods. Since each neighbor is expected to send regular updates, when no updates are received for a while, the receiver may make the determination that the corresponding computer is no longer a neighbor. When that occurs, any route using that computer as a next hop should be deleted, including the one indicating that the computer as the actual (formerly neighboring) destination. The number of update periods that may transpire before entries are determined will result in more stale routing entries, but would also allow for more transmission errors. Transmission errors are likely to occur when a CSMA-type broadcast medium is used, as may well be the case for many wireless implementations. When the link breaks, an $\infty$ metric route should be scheduled for it and the routes that depend on it.

Figures 4, 5:
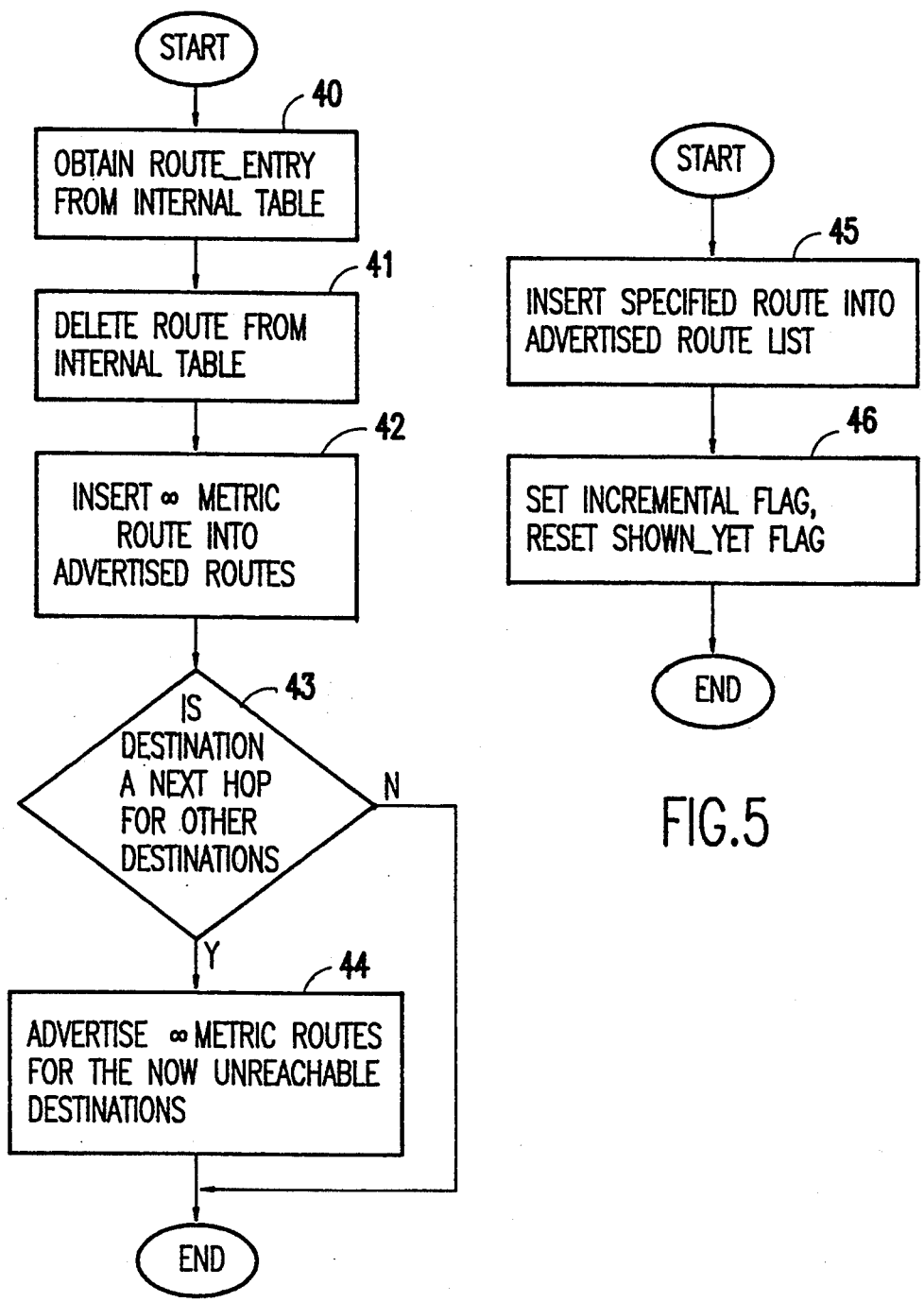
FIG. 4 is flow diagram showing the logic of the time out procedure.
FIG. 5 is a flow diagram showing the logic of the "ADVERTISE" event handing.

FIG. 4 shows the time out procedure when the data is judged to be stale. The route_entry is first obtained from the event list data in function block 40, then the route is deleted from the internal table in function block 41. In function block 42, the $\infty$ metric is inserted into the table of advertised routes, and then a test is made in decision block 43 to determine whether that destination is a next hop for other destinations. If so, $\infty$-metric routes are advertised for the now unreachable destinations in function block 44. As shown in FIG. 5, the "ADVERTISE" event handling involves inserting a specified route into the advertised route list in function block 45 and then setting the INCREMENTAL flag in function block 46. At the same time, the SHOWN_YET flag is reset. The route to be inserted will show an $\infty$ metric to the destination.

Figure 6:
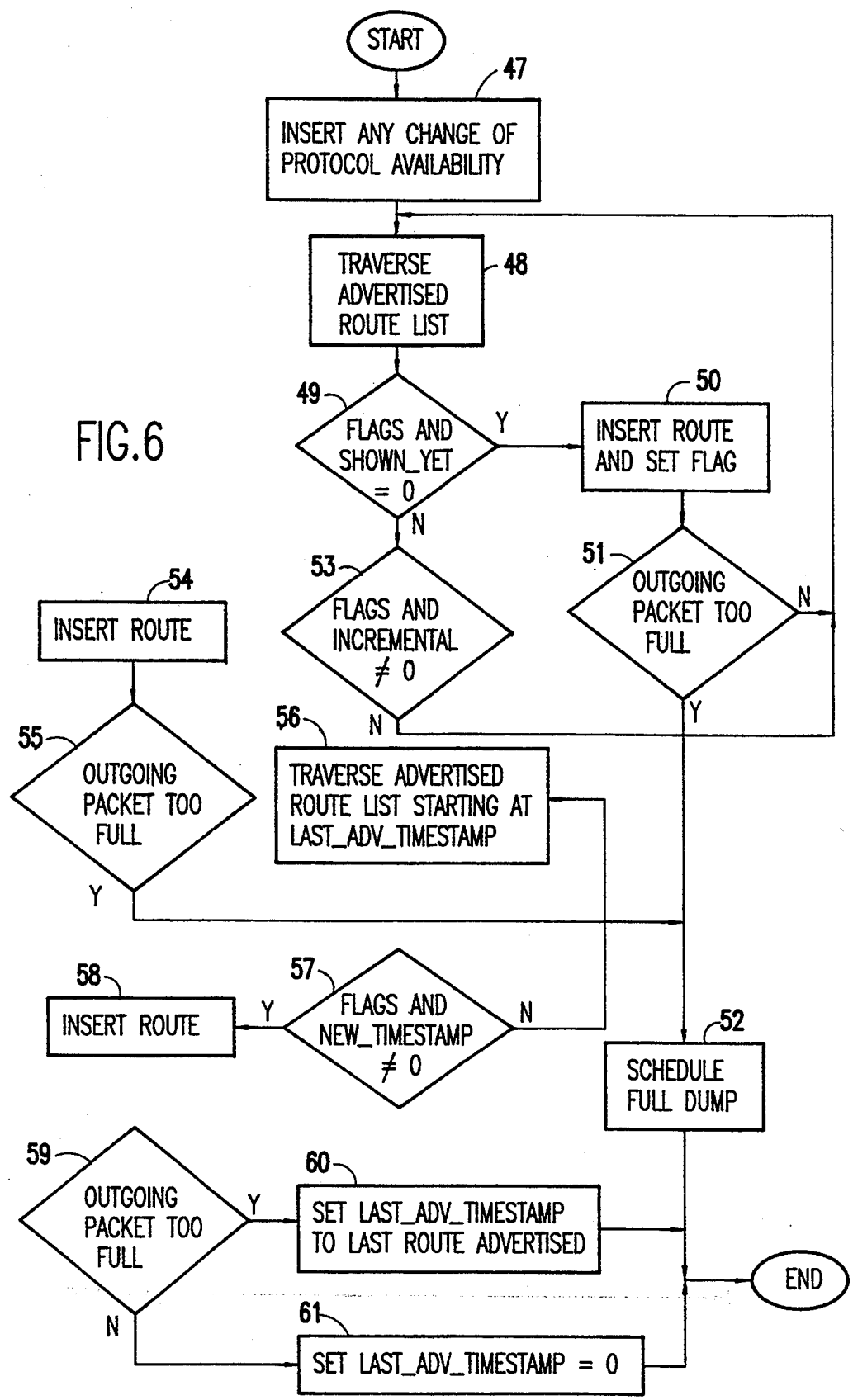
FIG. 6 is a flow diagram showing the logic of the incremental update transmission.

FIG. 6 shows the logic of the incremental update transmission from a Mobile Host. The process begins in function block 47 where a change of protocol availability is inserted. Then, in function block 48, the advertised route list is traversed, and a check is made in decision block 49 for the FLAGS and SHOWN_YET=0. When this condition is met, the route is inserted and the flag is set in function block 50. A test is then made in decision block 51 to determine if the outgoing packet is too full. If so, a full dump is scheduled in function block 52 before the process ends; otherwise, the process loops back to function block 48 to traverse the advertised route list.

As the advertised route list is traversed, a test is also made in decision block 53 to determine if FLAGS & INCREMENTAL≠0. If not, the process loops back to function block 48; otherwise, the route is inserted in function block 54. A test is made in decision block 55 to determine if the outgoing packet is too full. If so, a full dump is scheduled in function block 52; otherwise, the advertised route list is again traversed in function block 56, but this time starting at LAST_ADV₁₃TIMESTAMP. As the advertised route list is traversed, a test is made in decision block 57 to determine if FLAGS & NEW_TIMESTAMP≠0. If so, the route is inserted in function block 58, and a test is made in decision block 59 to determine if the outgoing packet is too full. If so, the LAST_ADV_TIMESTAMP is set to the last route advertised in function block 60; otherwise the LAST_ADV_TIMESTAMP is set to zero in function block 61, and the process ends.

Figure 7:
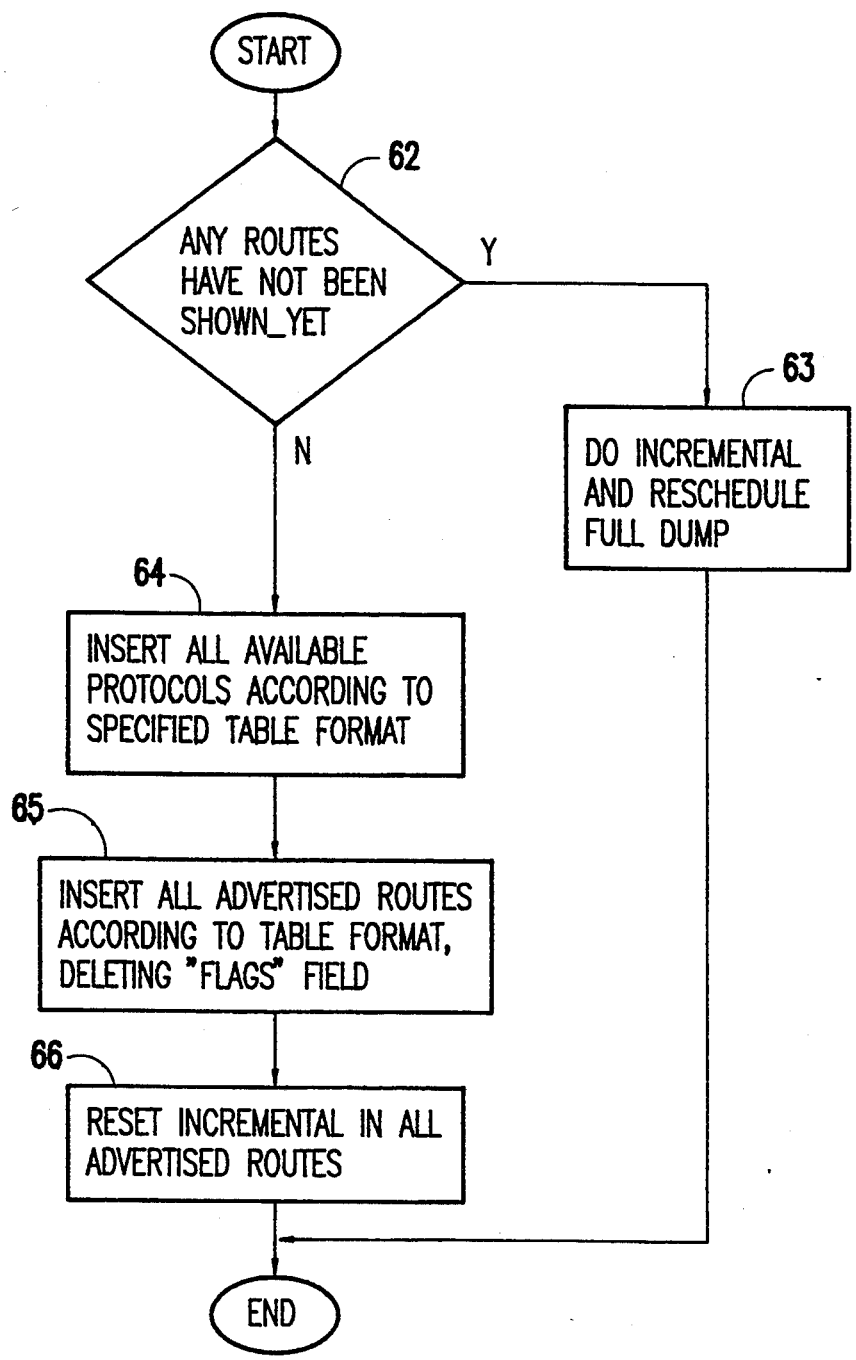
FIG. 7 is a flow diagram showing the logic of the full dump transmission.

FIG. 7 shows the logic of a full dump transmission from a Mobile Host. A test is first made in decision block 62 to determine if any routes have not been shown yet. If so, an incremental transmission is done and a full dump is rescheduled in function block 63 before the process ends; otherwise, all available protocols are inserted according to specified table format in function block 64. Then, in function block 65, all advertised routes are inserted according to table form, deleting the "FLAGS" field. Finally, incremental is reset in all advertised routes in function block 66, and the process ends.

Figure 8:
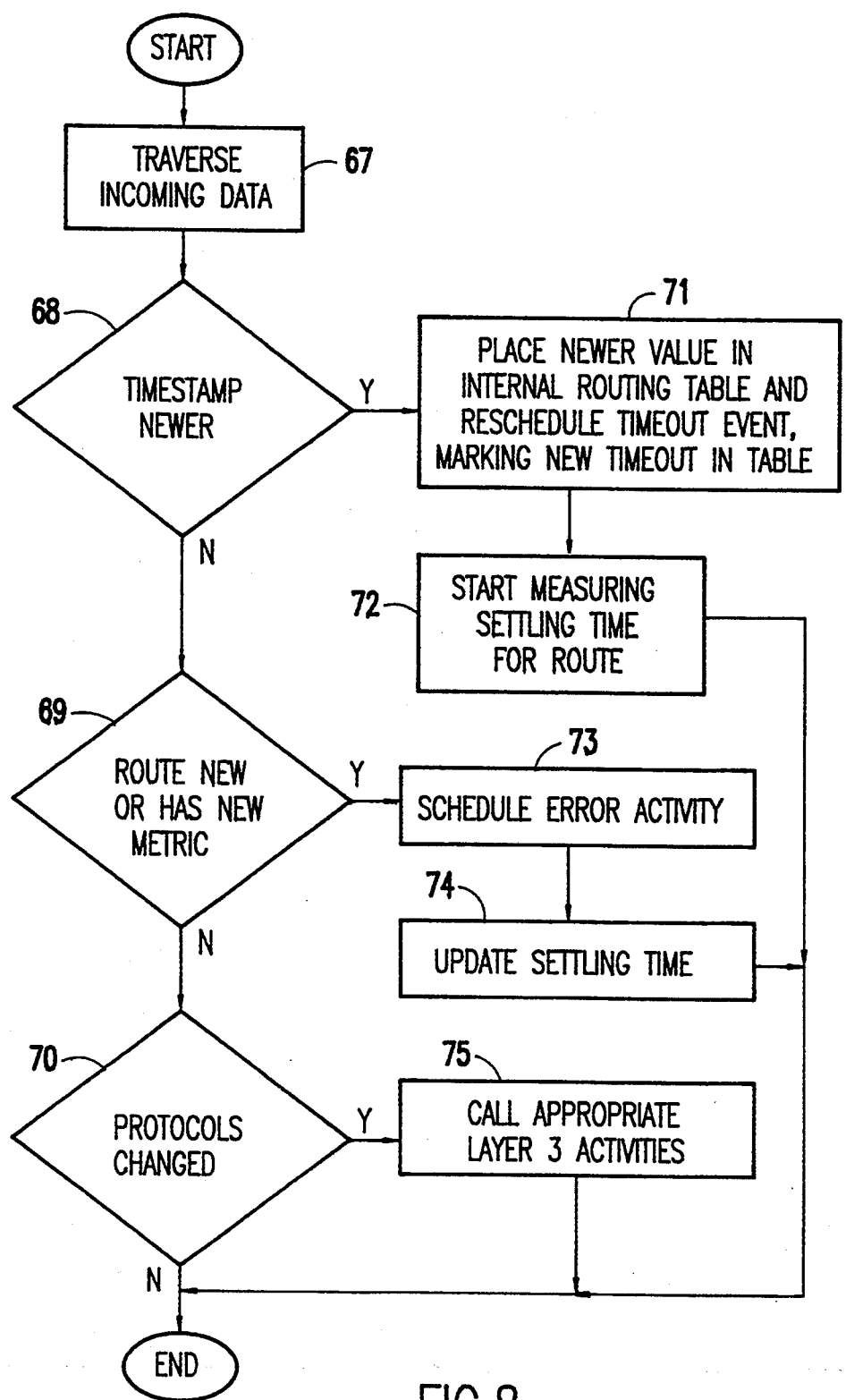
FIG. 8 is a flow diagram showing the logic of the full dump processing upon reception.

FIG. 8 shows the logic of the full dump processing upon reception. The incoming data is traversed in function block 67 to first determine if the timestamp is newer in decision block 68, whether the route is new or has a new metric in decision block 69, or if any protocols have changed in decision block 70. If the timestamp is newer, then the current value is placed in the internal routing table and the timeout event rescheduled, marking the new timeout in the table, in function block 71. Then in function block 72, the measurement of settling time for the route is started, and the process ends. If, on the other hand, the route is new or has a new metric, an error activity is scheduled in function block 73. Then, in function block 74, the setting time is updated, and the process ends. If, on the other hand, any protocols have changed, the appropriate Layer 3 activities are changed in function block 75, using Address Resolution Protocol (ARP) table management, for instance.

Figure 9:
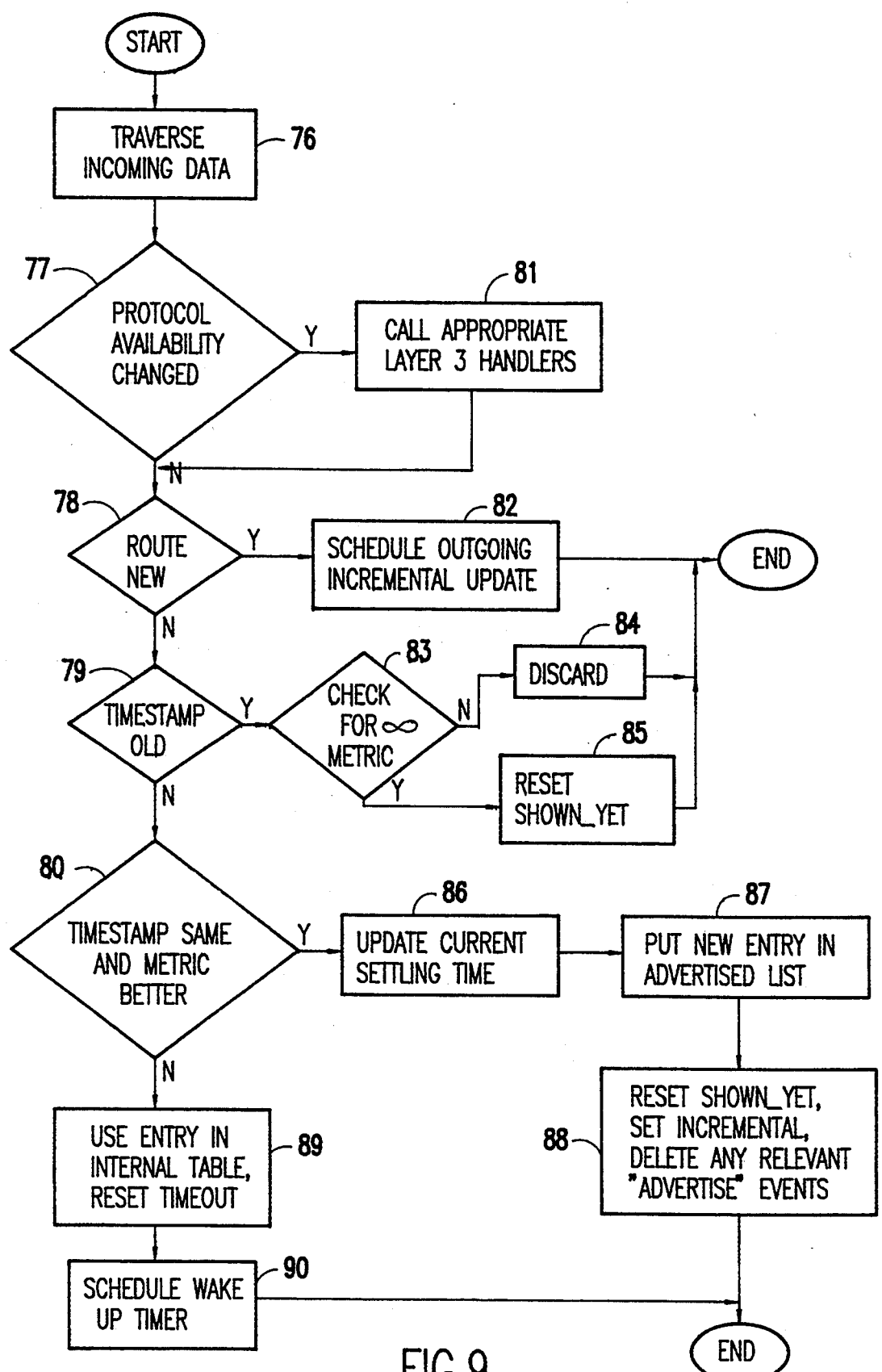
FIG. 9 is a flow diagram showing the logic of the incremental update processing upon reception.

FIG. 9 shows the incremental update processing upon receipt. The incoming data is traversed in function block 76 to determine if the protocol availability has changed in decision block 77, if the route is new in decision block 78, if the timestamp is old in decision block 79, and whether the timestamp is the same and the metric is better in decision block 80. If the protocol availability has changed, the appropriate Layer 3 handlers are called in function block 81, and the process continues at decision block 78. If the route is new, an outgoing incremental update is scheduled in function block 82, and the process ends. If the timestamp is old, a further test is made in decision block 83 to determine if the route has an ∞ metric. If not, it is discarded in function block 84, and the process ends. If the route has an ∞ metric, the SHOWN_YET flag is reset in function block 85, and the process ends. If the timestamp is the same and, the metric is better, the current settling time is updated in function block 86, and the new entry is first placed in the advertised list in function block 87. Then, the SHOWN_YET flag is reset, the incremental is set, and any relevant "ADVERTISE" events are deleted in function block 88, and the process ends. Returning to decision block 80, a negative result leads to function block 89 where the route entry in the internal table is used and the timeout is reset. Then, a wake up is scheduled after the current estimate of settling time in function block 90, and the process ends.

Figure 10:
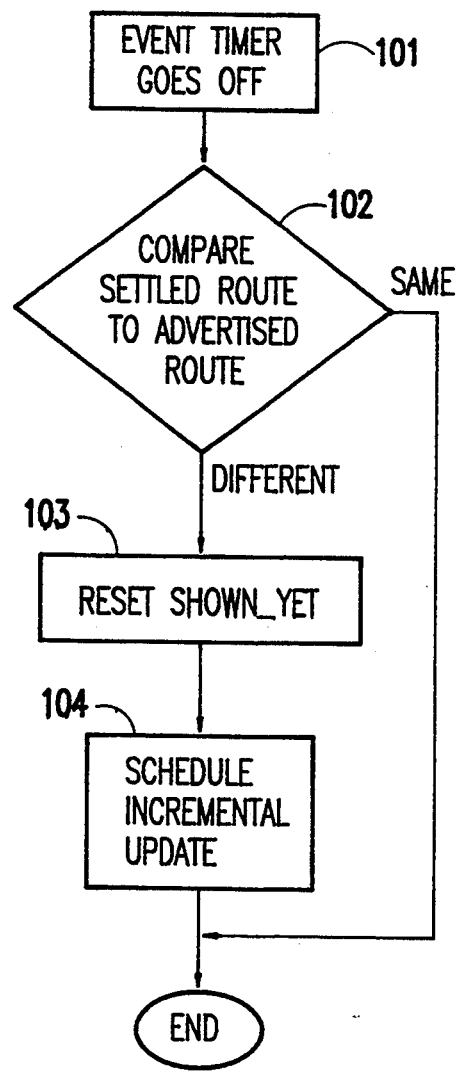
FIG. 10 is a flow diagram showing the logic of inserting a route into advertised routes after settling time has passed.

FIG. 10 shows the flow diagram for inserting a route into advertised routes after the settling time has passed. The process begins when the wake up event timer set in function block 90 of FIG. 9 goes off in function block 101. When this occurs, a test is made in decision block 102 to determine if the settled route is the same as the advertised route. If they are the same, nothing needs to be done, and the process ends. If, however, they are different, SHOWN_YET is reset in function block 103, and the next incremental update is scheduled in function block 104, before the process ends.

There are additional data fields, other than those stated above, which might be transmitted as part of each entry in the routing tables which are broadcast by each participating computer (mobile or base station). These fields may depend, for instance, on higher level protocols or other protocols depending on the operation of the link layer. For instance, to enable correct ARP operation, each routing table entry might also have to contain the Internet Protocol (IP) address corresponding to the destination address. This would be done to enable an intermediate computer, when serving a routing function for its neighbors, to also issue "proxy ARP" replies instead of routing ARP broadcasts around.

Pseudo-C-code documenting various procedures used for effecting an ad-hoc network among cooperating Mobile Hosts is listed below:

```
struct forwarding_route_entry {
    address_t destination;
    address_t next_hop;
    value_t metric;
    value_t settling_time;
    value_t install_time;
    protocol_list;
    flags;
}
/*
 * Initialize this table to always include data
 * about the Mobile Host executing these procedures.
 */
```

```
struct advertised_route_entry { address_t destination;
  value_t metric;
  proto_ptr protocol_list;

struct advertised_route_entry
  *advertised_route_table = {my_address, 0,
  my_protocol_list};

struct protocol_list {
  value_t protocol_type;
  value_t address_size;
  u_char[] layer_3_address;
}
/*
 * Each Mobile Host has to maintain two tables of
 * route entries;
 *   - the route entries which are to
 *     be advertised
 *   - the routes used for forwarding.
 */
/*
 * Each Mobile Host has to maintain an event list
 * with nodes for each kind of possible timeout
 * event. The possible events are as follows:
 *   - Time out a route table entry
 *   - Add a route to the advertisement table,
 *     whose advertisement was delayed to avoid
 *     possible oscillations.
 *   - Broadcast a periodic advertisement
 *     (incremental or full)
 */
Timeout()
{
  get_event_from_list();
  switch (event_type)
```

```
    case ROUTE_TIMEOUT:
      bad_route = event_type->route;

if (bad_route->metric = 1)   /* Oops, a
        neighbor has died */
        for (route = first;  /* For every route in
          table */) {
          if route->next_hop = bad_route) {
            route->metric = INFINITE_METRIC;
            route->flags  = METRIC_CHANGED;
            route->timestamp |= 1;
          }
        }
      bad_route->flags |= METRIC_CHANGED;
      bad_route->metric = INFINITE_METRIC;
      bad_route->timestamp |= 1;   /* incremented by
        1! */
      do_incremental();
      break;
    case ADD_ADVERTISEMENT:
      route->flags |= CHANGED;
      break;
    case DO_ADVERTISEMENT:
      if (full_dump_scheduled)
        do_full_dump();
      else
        do_incremental();
      break;
  }
}
struct settling_time_table {
  address_t destination;
  time_t settling_time;
  value_t number_of_next_hops;
  addr_list next_hop list;
}
struct next_hop_list {
  address_t next_hop;
```

```
   list_ptr *next_hop_list;
}
do_full_dump()
{
   get_empty_NPDU();
   for (/* each route in advertised_route_table */)
      {
      copy_route_into_NPDU()
      if (NPDU_full) (
         transmit_NPDU();
         get_empty_NPDU();
      }
      route->flags &=   /* Reset change bits */
         NOT(CHANGED | CHANGED_PROTOCOL |
            CHANGED_METRIC);
      }
      /* Note that my data was automatically included
         above */
      schedule_full_dump(USUAL_PERIOD);
}
/*
 * Incremental dumps are built up in several
 * sections:
 *    - an entry for the transmitting station (i.e,
 *      this Mobile Host)
 *    - entries for any new Mobile Hosts or Mobile
 *      Hosts that have modified Layer-3 protocol
 *      availability information.
 *    - entries for any new Mobile Hosts that have
 *      substantially changed routing information
 *    - entries reflecting new timestamps only.
 * Incremental packets are constrained to fit within
 * one Layer-3 packet (Network Protocol Data Unit)
 * only. If there are too many important changes to
 * report, a full dump must be scheduled. If there
 * are too many timestamp updates to report, keep
 * track of the last reported timestamp update and
 * start there next time.
 */
```

```
do_incremental_dump()
{
  get_empty_NPDU();
  /* First transmit own new timestamp, metric 0 */
  if (route_to_myself->timestamp & 0x00000001 != 0)
    printf ("Unexpected internal timestamp
       error\r\n");
  route_to_myself->timestamp = route_to_myself + 2;
  copy_route_into_NPDU(route_to_myself)
  for ( route=first; /* each route in
    advertised_route_table */)
    if (route->flags & PROTOCOL_CHANGED)
       copy_route_into_NPDU(route)
    if (NPDU_full) (
       schedule_full_dump(IMMEDIATE);
       printf ("Unexpectedly full incremental!\n");
       transmit_NPDU();
       get_empty_NPDU();
    }
  }
  for ( route=first; /* each route in
    advertised_route_table */) {
    if (route->flags & ALREADY_DONE) continue;
       /* Already showed this one above */
    if (route->flags & METRIC_CHANGED)
       copy_route_into_NPDU(route)
    if (NPDU_full) (
       schedule_full_dump(IMMEDIATE);

printf ("Unexpectedly full incremental!\n");
       transmit_NPDU();
       get_empty_NPDU();
    }
  }
  for ( route=last_timestamp_shown; /* */) {
    if (route->flags & ALREADY_DONE) continue;
       /* Already showed this one above */
    if (route->flags & TIMESTAMP_CHANGED) {
       copy_route_into_NPDU(route)
```

```
      last_timestamp_shown = route;
    }
    if (NPDU_full) (
      break; /* Stop building incremental
        packet */
    }
  }
}
transmit_NPDU();
}
/*
 * When the Mobile Host receives a routing
 * information packet from one
 * of its neighbors, it looks at each route entry in
 * the packet, deciding whether to update its
 * internal routing tables. If the incoming packet
 * is a full dump, no substantially different
 * information is usually expected. New routes are
 * accepted if they are more recent, or if they are
 * equally recent but have a better metric.
 *
 * When an incoming route is accepted on the basis
 * of a more recent timestamp, a decision is made
 * about whether to advertise the new
 * route or not. This decision depends on the past
 * history of routes obtained from the transmitter
 * of the packet (i.e, the next hop) for the
 * particular destination Mobile Host.
 *
 * Note that the metric shown for any incoming route
 * must be incremented by 1, to reflect the fact
 * that any path through the next hop will
 * be one hop longer than it is at the next hop
 * (because of the hop from this Mobile Host to the
 * next hop).
 */
process_incoming_route_update()
{
  must_schedule_incremental = FALSE;
```

```
for (new_route=packet_data; /* Do each entry in
   the packet */) {
   old_route = find(new_route, route_table);
   new_route->metric = new_route->metric + 1;
   if (new_route->timestamp >
      old_route->timestamp) {
      new_route->timeout =
         calculate_timeout(new_route);
      replace (old_route, new_route,
         route_table);
      delete_timeout_event (old_route);
      schedule_timeout_event (new_route);
      if (new_route->type & CHANGED_PROTOCOL) {
         must_schedule_incremental = TRUE;
         new_route->flags |= CHANGED_PROTOCOL;
         new_route->install_time =
            current_time();
      }
      else if ((new_route->type &
         CHANGED_METRIC) ||
         (new_route->metric < old_route->metric {
         must_schedule_incremental = TRUE;
         new_route->flags |= CHANGED_METRIC;
         new_route->install_time = current_time();
      }
      else if (new_route->metric >=
         old_route->metric) {
         stable_time = check_settling_time
            (new_route);
         if (0 == stable_time) /* advertise it */
            new_route->flags |= CHANGED;
         else
            enter_event_list(new_route,
               stable_time,ADD_ADVERTISEMENT);
      }
   }
   else if ((new_route->timestamp ==
      old_route->timestamp) &&
```

```
        (new_route->metric < old_route->metric)) {
      enter_settling_time_data (old_route,
        new_route);
      new_route->timeout =
        calculate_timeout(new_route);
      replace (old_route, new_route,
        route_table);
      delete_timeout_event (old_route);
      schedule_timeout_event (new_route);
      new_route->flags |= CHANGED_METRIC;
      new_route->install_time = current_time();
    }
  }
  if (must_schedule_incremental) {
    schedule_incremental(IMMEDIATE);
  if (incoming_packet->packet_type == FULL_DUMP)
    printf ("Full dump has new, unreported
      data!\r\n");
}

/*
 * In order to damp out oscillations, data is kept
 * about how often the routes change. It is
 * conceivable in certain situations that route
 * advertisements are received by a particular
 * Mobile Host with the same timestamp, but "out of
 * order" -- in other words, two routes with the
 * same timestamp arrive worse metric first.
 * Two pieces of data are kept:
 *    last settling_time
 *    average settling_time.
 * The average settling time is calculated by
 * multiplying by 16 the previous average,
 * multiplying by two the current value, adding the
 * results, and dividing by 18. This has the effect
 * of weighting the most recent result a little
 * heavier than the previous 16 results.
 */
enter_settling_time (new_route, old_route)
```

```
{
    route_data = find (new_route->destination,
        old_route->next_hop, settling_time_table);
    settling_time = (16 *
        route_data->settling_time) +
        2 * (current_time() - old_route->install_time);
    settling_time = settling_time / 18;
}
check_settling_time (new_route)
{
    route_data = find (new_route,
        settling_time_table);
    settling_time_data = route_data->settling_time;
    if (settling_time_data == NULL) return 0;
    if (settling_time_data > MAXIMUM DELAY) return 0;
    else return (settling_time_data);
}
```

While the invention has been described in terms of a single preferred embodiment, those skilled in the art will recognize that the invention can be practiced with modification within the spirit and scope of the appended claims. The new routing algorithm of the invention was particularly developed for enabling the creation of "ad-hoc networks", which are most dramatically required for the operation of mobile computers. However, the routing algorithm itself, and the operation of an "ad-hoc network", can be beneficially used in situations which do not include mobile computers. For instance, the routing algorithm could be applied in any situation where reduced memory requirements are desired (compared to link-state routing algorithms). The operation of an "ad-hoc network" could be applied to wired as well as wireless mobile computers. In general, then, the invention provides a new destination-sequenced routing algorithm, and this algorithm is supplemented by a technique for damping oscillations.

Having thus described my invention, what I claim as new and desire to secure by Letters Patent is as follows:

1. A method for routing a packet of information between two mobile hosts that are coupled to an ad-hoc network comprised of a plurality of mobile hosts, each of the mobile hosts having a unique network address but not having a fixed location, said ad-hoc network conforming to a network standard including a network-layer and a link-layer, said method comprising the steps of:
    storing routing tables at each mobile host, said routing tables including a "metric" defined as a number of hops from a source mobile host to a destination mobile host;
    advertising routes by periodically broadcasting by each mobile host the routing table stored by the mobile host;
    originating a time stamp by a destination mobile host;
    tagging each route table entry with a time stamp originated by the destination mobile host;
    updating, for each destination mobile host, mobile host stored routing tables based on received broadcasts from other mobile hosts;
    retransmitting by each mobile host new routing information received from a neighboring mobile host; and
    routing a packet of information by choosing a route from updated routing tables for transmitting a packet of information from a source mobile host as a route having a best "metric" for a desired destination mobile host, said best "metric" being a minimum number of hops that a packet must jump before reaching its destination, the routing being performed at the link-layer of the ad-hoc network.

2. The method of routing recited in claim 1 wherein a new route is defined to be one with a better metric, a better metric being a fewer number of hops a packet must jump before reaching its destination, or a metric of infinity, a metric of infinity indicating a broken link meaning that a particular destination is no longer reachable and thus all other destinations depending upon the newly unreachable destination are themselves unreachable, said step of retransmitting new routing information received from a neighboring mobile host being performed immediately upon reception of new routing information by a mobile host.

3. A method for routing a packet of information between two mobile hosts that are coupled to an ad-hoc network comprised of a plurality of mobile hosts, each of the mobile hosts having a unique network address but not having a fixed location, said method comprising the steps of:
    storing routing tables at each mobile host, said routing tables including a "metric" defined as a number of hops from a source mobile host to a destination mobile host;
    storing routes in said routing tables;

advertising routes by periodically broadcasting by each mobile host the routing table stored by the mobile host;

originating a time stamp by a destination mobile host;

tagging each route table entry with a time stamp originated by the destination mobile host;

updating, for each destination mobile host, mobile host stored routing tables based on received broadcasts from other mobile hosts;

keeping data about how often routes, stored in said routing tables, change;

measuring stabilities of routes by determining average settling times of the routes stored in said routing tables;

storing determined average settling times of routes in a settling time table;

accessing the settling time table prior to the step of advertising and delaying the advertising of the routes which may change soon to damp oscillations of information in said route tables;

retransmitting by each mobile host new routing information received from a neighboring mobile host; and choosing a route from Updated routing tables for transmitting a packet of information from a source mobile host as a route having a best "metric" for a desired destination mobile host, said best "metric" being a minimum number of hops that a packet must jump before reaching its destination.

4. The method of routing recited in claim 3 further comprising the step of weighting the determined average settling times of routes by counting a most recent measurement of the settling time of a particular route with a higher weighting factor than less recent measurements.

5. A method for routing a packet of information between two mobile hosts that are Coupled to an ad-hoc network comprised of a plurality of mobile hosts, each of the mobile hosts having a unique network address but not having a fixed location, wherein the ad-hoc network conforms to a network standard including a network-layer and a link-layer, said method comprising the steps of:

storing routing tables at each mobile host, said routing tables including a "metric" defined as a number of hops from a source mobile host to a destination mobile host;

storing routing information in said routing tables based on network-layer addresses of the mobile hosts;

advertising routes by periodically broadcasting by each mobile host the routing table stored by the mobile host;

originating a time stamp by a destination mobile host;

tagging each route table entry with a time stamp originated by the destination mobile host;

updating, for each destination mobile host, mobile host stored routing tables based on received broadcasts from other mobile hosts;

keeping data about how often routes, stored in said routing tables, change;

measuring stabilities of routes by determining average settling times of the routes stored in said routing tables;

storing determined average settling times of routes in a settling time table;

accessing the settling time table prior to the step of advertising and delaying the advertising of the routes which may change soon to damp oscillations of information in said routing tables;

retransmitting by each mobile host new routing information received from a neighboring mobile host; and choosing a route from updated routing tables for transmitting a packet of information from a source mobile host as a route having a best "metric" for a desired destination mobile host, said best "metric" being a minimum number of hops that a packet must jump before reaching its destination.

6. A method for routing a packet of information between two mobile hosts that are coupled to an ad-hoc network comprised of a plurality of mobile hosts, each of the mobile hosts having a unique network address but not having a fixed location, said ad-hoc network conforming to a network standard including a network-layer and a link-layer, said method comprising the steps of:

storing routing tables at each mobile host., said routing tables including a "metric" defined as a number of hops from a source mobile host to a destination mobile host;

storing routing information in said routing tables based on link-layer addresses of the mobile hosts;

advertising routes by periodically broadcasting by each mobile host the routing table stored by the mobile host;

originating a time stamp by a destination mobile host;

tagging each route table entry with a time stamp originated by the destination mobile host;

updating, for each destination mobile host, mobile host stored routing tables based on received broadcasts from other mobile hosts;

keeping data about how often routes, stored in said routing tables, change;

measuring stabilities of routes by determining average settling times of the routes stored in said routing tables;

storing determined average settling times of routes in the settling time table;

accessing the settling time table prior to the step of advertising and delaying the advertising the routes which may change soon to damp oscillations of information in said routing tables;

retransmitting by each mobile host new routing information received from a neighboring mobile host; and choosing a route from updated routing tables for transmitting a packet of information from a source mobile host as a route having a best "metric" for a desired destination mobile host, said best "metric" being a minimum number Of hops that a packet must jump before reaching its destination.

7. The method of routing recited in claim 1 further comprising the step of tracking network layer protocol availability data on a per destination basis.

8. A method for routing a packet of information between two mobile hosts that are coupled to an ad-hoc network comprised of a plurality of mobile hosts, each of the mobile hosts having a unique network address but not having a fixed network location, wherein the ad-hoc network conforms to a network standard including a network-layer and a link-layer, said method comprising the steps of:

storing link-layer routing tables at each mobile host, said routing tables including a "metric" defined as a number of hops from a source mobile host to a destination mobile host;

advertising routes by periodically broadcasting by each mobile host the routing table stored by the mobile host;

originating a time stamp by a destination mobile host;

tagging each route table entry with a time stamp originated by the destination mobile host;

updating, for each destination mobile host, mobile host stored routing tables based on received broadcasts from other mobile hosts, said updating being limited to new routes defined to be those with a better metric, a better metric being a fewer number of hops a packet must jump before reaching its destination, or a metric of infinity, a metric of infinity indicating a broken link meaning that a particular destination is no longer reachable and thus all other destinations depending upon the newly unreachable destination are themselves unreachable;

retransmitting by each mobile host new routing information received from a neighboring mobile host, said step of retransmitting new routing information received from a neighboring mobile host being performed immediately upon reception of new routing information by a mobile host; and choosing a route from updated routing tables for transmitting a packet of information from a source mobile host as a route having a best "metric" for a desired destination mobile host, said best "metric" being a minimum number Of hops that a packet must jump before reaching its destination.

9. The method of routing recited in claim 8 further comprising the steps of:

keeping data about how often routes stored in said route tables change;

measuring stabilities of routes by determining average settling times of the routes stored in said route tables;

storing measured settling times of routes in a settling time table; and accessing the settling time table prior to the step of advertising and delaying the advertising the routes which may change soon to damp oscillations of information in said route tables.

10. The method of routing recited in claim 9 further comprising the step of weighting the measured settling times of routes by counting a most recent measurement of the settling time of a particular route with a higher weighting factor than less recent measurements.

* * * * *